(No Model.)

P. P. BRANNON.
COFFEE SEPARATOR.

No. 271,779. Patented Feb. 6, 1883.

WITNESSES:
Chas. Nida.
C. Sedgwick

INVENTOR:
P. P. Brannon
BY Munn & Co.
ATTORNEYS.

United States Patent Office.

PATRICK P. BRANNON, OF SANTA ANA, SAN SALVADOR, CENTRAL AMERICA, ASSIGNOR, BY MESNE ASSIGNMENTS, TO AUERBACH, ALTSCHUL & BRANNON, OF SAME PLACE.

COFFEE-SEPARATOR.

SPECIFICATION forming part of Letters Patent No. 271,779, dated February 6, 1883.

Application filed July 20, 1882. (No model.)

*To all whom it may concern:*

Be it known that I, PATRICK P. BRANNON, of Santa Ana, San Salvador, Central America, have invented certain new and useful Improvements in Coffee-Separators, of which the following is a full, clear, and exact description.

Reference is to be had to the accompanying drawings, forming part of this specification, in which similar letters of reference indicate corresponding parts in both the figures.

Figure 1:
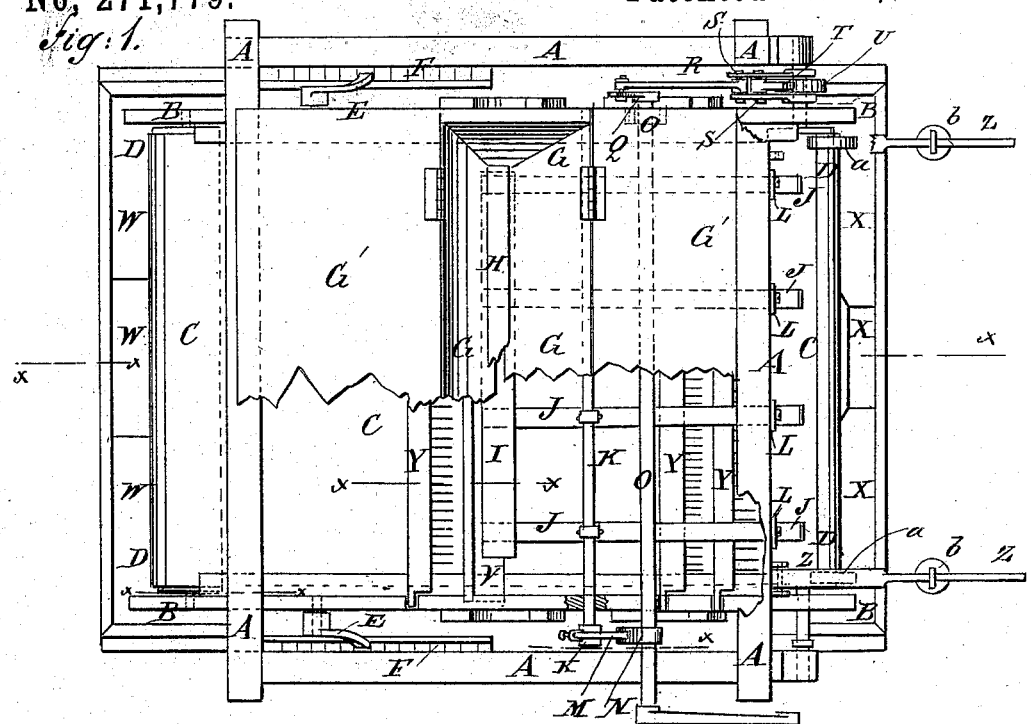
Figure 2:
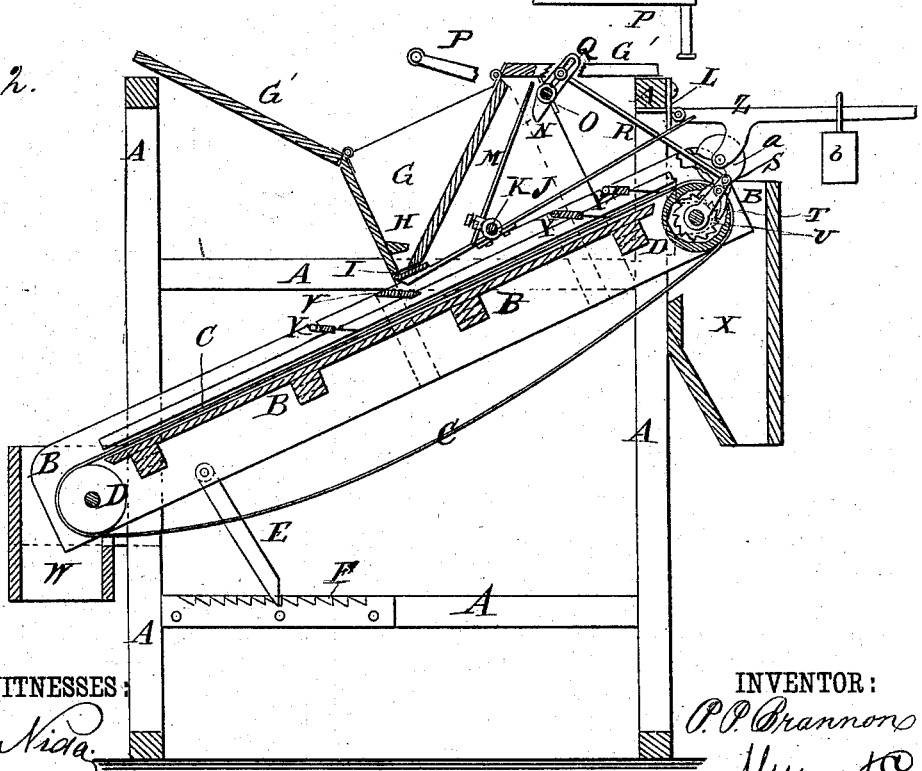

Figure 1 is a plan view of my improvement, parts being broken away. Fig. 2 is a sectional side elevation of the same, taken through the broken line $x\ x\ x\ x$, Fig. 1.

The object of this invention is to separate the round or pea berry coffee from the flat-berry or ordinary coffee quickly and thoroughly.

The invention consists in the peculiar construction and arrangement of a coffee-separator, as hereinafter more fully set forth, and pointed out in the claims.

A represents the frame of the machine.

B is an inclined frame, formed of two side boards and their connecting cross-bars and bottom or platform.

C is an endless apron, made of canvas, which passes around two rollers, D, pivoted to the end parts of the side boards of the frame B. The journals of the upper roller D project and work in bearings attached to the upper parts of the forward posts of the frame A, so as to serve as hinging-pivots to the frame B. The lower part of the frame B is supported by two pawls, E, the upper ends of which are hinged to the side bars of the said frame B, and their lower ends engage with the teeth of the ratchet-bars F, attached to the lower side bars of the frame A, so that any desired inclination can be given to the frame B by adjusting the pawls E upon the ratchet-bars F.

Upon the frame B rests the hopper G, from which the coffee-berries are fed to the endless apron C.

To the upper edges of the front and rear sides of the hopper G are hinged the edges of platforms G', the outer parts of which rest upon the top cross-bars of the frame A, so that the said platforms will rest upon the said cross-bars, however the frame B and hopper G be raised and lowered, and will serve as feed-aprons to support the bags from which the coffee is poured into the said hopper G.

The hopper G is made with a long narrow discharge-opening, and to the rear side of the said hopper, a little above the discharge-opening, is attached a board, H, to support the weight of the coffee in the hopper G, a narrow opening being left between the front edge of the said board H and the front side of the said hopper, through which the coffee can pass freely to the discharge-opening.

The discharge-opening at the bottom of the hopper G is closed by a plate, I, which serves as a valve to regulate the discharge of the coffee. The valve-plate I is attached to the lower ends of a number of springs, J, which are rigidly attached to and connected by a rock-shaft, K, which works in bearings attached to the forwardly-projecting end boards of the hopper G. The upper ends of the springs J rest against the lower ends of small slotted plates L, secured by screws to the top cross-bar of the frame A, so that the tension of the springs J can be regulated by adjusting the plates L.

To one end of the rock-shaft K is attached an arm, M, which projects upward and forward at the front side of the hopper G, into such a position as to be struck by the cam N, attached to the drive-shaft O, so that the springs J will be vibrated at each revolution of the said drive-shaft to move the valve-plate I, and thus cause an intermittent discharge of the coffee. The drive-shaft O revolves in bearings attached to the front parts of the hopper G, and to one of its ends is attached a crank, P, when the machine is to be operated by hand, or a pulley when the machine is to be operated by a power other than hand-power. To the other end of the drive-shaft O is attached a crank-arm, Q, which is slotted longitudinally to receive the crank-pin, so that the stroke can be lengthened or shortened, as may be desired.

To the crank Q is pivoted one end of the connecting-rod R, the other end of which is pivoted to and between the upper ends of two arms, S, the lower ends of which have holes formed through them to receive and work upon the journal of the upper roller D. To and between the arms S is also pivoted a pawl, T, which engages with the teeth of the ratchet-wheel U, attached to journal of the upper roller, D, between the arms S. With this construction the revolution of the drive-shaft will turn the roller D and carry the endless apron C forward with an intermittent movement.

To the frame B, directly beneath the discharge-opening of the hopper G, is attached a narrow board, v, to receive the coffee as it falls from the hopper G and distribute it so that it will be spread evenly over the endless apron C. With this construction, as the coffee passes to the endless apron C the round or pea berries will roll down the endless apron C, fall into the spout W, attached to the frame A, beneath the lower roller D of the endless apron C, and pass into a bag or other receiver. The flat berries will be carried up by the endless apron C, will fall into the spout X, secured to the frame A below the upper roller D, and will pass thence into a bag or other receiver.

Y are toothed bars or combs, the ends of which are placed in grooves or recesses in the side boards of the frame B, and their teeth rest upon the endless apron C. One or more of the combs Y are placed below the hopper G and one or more are placed above the said hopper, as shown in Figs. 1 and 2. The teeth of the combs Y are at such a distance apart that the coffee-berries will pass between the said teeth readily. The lower combs Y cause any flat berries that may be passing down the endless apron to turn over, so as to bring their flat sides in contact with the said endless apron, and thus be carried up by the said endless apron. The combs Y above the hopper G dislodge any round berries that may be carried up by the endless apron C and cause them to roll down the said endless apron C to the spout W.

To the front top bar of the frame A are hinged the ends of two levers, Z, to arms or brackets formed upon or attached to the lower sides of which are pivoted narrow wheels a, which roll upon the edges of the endless apron C, and thus keep the said endless apron from slipping upon the said roller.

From the outer parts of the levers Z are suspended weights b, so that by adjusting the said weights b the wheels a will be held down upon the endless apron C with any desired pressure.

Having thus fully described my invention, I claim as new and desire to secure by Letters Patent—

1. In a coffee-separator, the combination, with the hopper G and the drive-shaft O, of the valve-plate I, the springs J, the rock-shaft K, the arm M, and the cam N, substantially as herein shown and described, whereby the coffee will be discharged from the said hopper intermittingly, as set forth.

2. In a coffee-separator, the combination, with the drive-shaft O, the rollers D, the endless apron C, crank Q, arms S, connecting-rod R, pawl T, and ratchet-wheel U, of the hinged levers Z, wheels a, and weights b, whereby an intermittent motion is imparted to the endless apron and the latter is kept from slipping, substantially as described.

3. In a coffee-separator, the combination, with the spring valve-plate I, rock-shaft K, arm M, endless apron C, and rollers D, of the drive-shaft O, carrying the cam N at one end and crank Q at its opposite end, arms S, connecting-rod R, pawl T, and ratchet-wheel U, substantially as described, and for the purpose set forth.

PATRICK P. BRANNON.

Witnesses:
JAMES T. GRAHAM,
C. SEDGWICK.